H. L. LIPMAN.

Assignor, by mesne assignments, to J. RECKENDORFER,

Pencil.

No. 7,992. Reissued Dec. 11, 1877.

Witnesses:

M. Georgii

R. E. Grant

Inventor:

Joseph Reckendorfer assignee of Hymen L. Lipman by M. Wallace Bailey his attorney

N. PETERS, PHOTO-LITHOGRAPHER, WASHINGTON, D. C.

UNITED STATES PATENT OFFICE.

JOSEPH RECKENDORFER, OF NEW YORK, N. Y., ASSIGNEE, BY MESNE ASSIGNMENTS, OF HYMEN L. LIPMAN.

IMPROVEMENT IN PENCILS.

Specification forming part of Letters Patent No. 19,783, dated March 30, 1858; Reissue No. 7,992, dated December 11, 1877; application filed November 21, 1877.

*To all whom it may concern:*

Be it known that HYMEN L. LIPMAN, of Philadelphia, Pennsylvania, did invent certain new and useful Improvements in Lead-Pencils, of which the following is a specification, reference being had to the accompanying drawing, in which—

Figure 1:
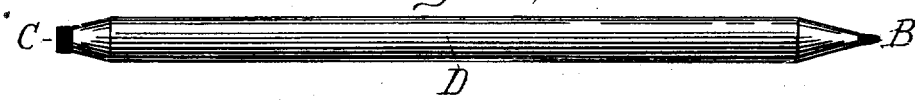
Figure 2:
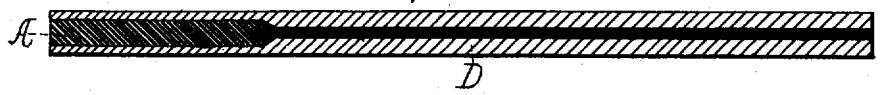

Figure 1 is a side view, and Fig. 2 is a longitudinal central section, of a pencil embodying the invention.

The pencil in which this invention is comprised consists of a continuous wooden sheath, D, in which is formed an interior groove, A, adapted to receive a lead core, B, of the size usually employed in lead-pencils. This groove, at one end of the pencil, is enlarged, and of increased diameter for a portion—say about one-quarter—of its length, as shown. The lead core, instead of extending from one end to the other of the pencil, as in ordinary pencils, is confined to the narrow portion of the groove, and stops short of the enlarged-end portion thereof, and in said enlarged portion is inserted a stick of erasive rubber, C, glued at one edge to the sheath.

The pencil is finished externally in the usual manner.

On cutting one end thereof you have the lead B, and on cutting the other end you expose the rubber C, ready for use, and particularly valuable for removing or erasing lines, figures, &c., and not subject to be soiled or mislaid on the table or desk.

In making mathematical, architectural, and many other kinds of drawings in which the lines are very near each other, the eraser is particularly useful, as it may be sharpened to a point to erase any marks between the lines; and should the point of the rubber become soiled or inoperative from any cause, such cause is easily removed by a renewed sharpening, as in the ordinary lead-pencil.

The combination in one instrument of a lead-pencil and a rubber eraser is not here claimed; nor is it intended to claim, broadly, a lead-pencil with a piece of india-rubber or other erasing material attached at one end for the purpose of erasing marks; but

What is claimed as the invention of the said HYMEN L. LIPMAN is—

A pencil consisting of a continuous wooden sheath, formed with an interior groove, enlarged for a portion of its length at one end of the sheath, containing in the enlarged portion of the groove a stick of erasive rubber, and in the narrower portion of the groove a lead core, as set forth.

In testimony whereof I have hereunto signed my name in presence of two subscribing witnesses.

JOSEPH RECKENDORFER.

Witnesses:
S. BRAISTED,
WILLIAM V. A. POE.